(12) United States Patent
Butter et al.

(10) Patent No.: US 6,430,833 B1
(45) Date of Patent: Aug. 13, 2002

(54) MEASURING PROBE WITH DIAPHRAGMS AND MODULES

(75) Inventors: Andrew G Butter; David R McMurtry, both of Wotton-under-Edge (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 09/701,335

(22) PCT Filed: Apr. 6, 2000

(86) PCT No.: PCT/GB00/01309

§ 371 (c)(1), (2), (4) Date: Nov. 27, 2000

(87) PCT Pub. No.: WO00/60307

PCT Pub. Date: Oct. 12, 2000

(30) Foreign Application Priority Data

Apr. 6, 1999 (GB) .............................. 9907643

(51) Int. Cl.$^7$ ................................. G01B 5/00
(52) U.S. Cl. .............................. 33/559; 33/556; 33/561; 33/DIG. 3
(58) Field of Search ....................... 33/556–561, DIG. 3

(56) References Cited

U.S. PATENT DOCUMENTS

| 4,084,323 A | 4/1978 | McMurtry | |
|---|---|---|---|
| 4,158,919 A | 6/1979 | McMurtry | |
| 4,187,614 A | 2/1980 | Abiru et al. | |
| 4,523,383 A | 6/1985 | Rogers et al. | |
| 4,701,704 A | * 10/1987 | Fukuyoshi et al. | ........... 33/558 |
| 4,963,728 A | 10/1990 | Hof et al. | |
| 5,088,208 A | 2/1992 | Wells et al. | |
| 5,222,304 A | * 6/1993 | Butler | ........... 33/561 |
| 5,345,689 A | 9/1994 | McMurtry et al. | |
| 5,404,649 A | * 4/1995 | Hajdukiewicz et al. | ....... 33/503 |
| 5,548,902 A | * 8/1996 | Ernst | ........... 33/561 |
| 5,755,038 A | 5/1998 | McMurtry | |

FOREIGN PATENT DOCUMENTS

| EP | 0 426 492 A | 5/1991 |
|---|---|---|
| EP | 0 501 710 A1 | 9/1992 |
| EP | 0 532 169 A1 | 3/1993 |
| EP | 0 544 854 B1 | 9/1996 |

* cited by examiner

Primary Examiner—Diego Gutierrez
Assistant Examiner—Mirellys Jagan
(74) Attorney, Agent, or Firm—Oliff & Berridge, PLC

(57) ABSTRACT

A measuring probe includes a suspension module 112 in which a stylus holder 140 is suspended from a housing on a pair of diaphragms 142, 144. At least one of the diaphragms is formed with spiral cut-outs whereby the stylus, which is connected at the centre of the diaphragms, is able to move transversely of the axis of the housing as the stylus holder pivots when transverse forces are applied to the stylus tip. A transducer module 110 is releasably supported on the suspension module by a kinematic mounting 116, 118 and is retained in position by magnets 120. The transducer module contains optical transducers 200, 210, 220 for measuring the deflection of the stylus.

12 Claims, 4 Drawing Sheets

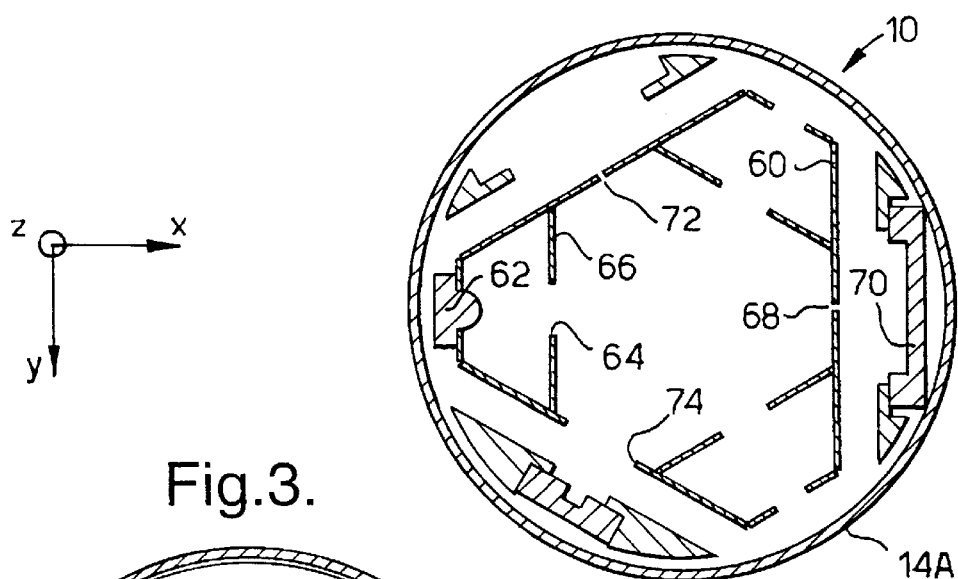
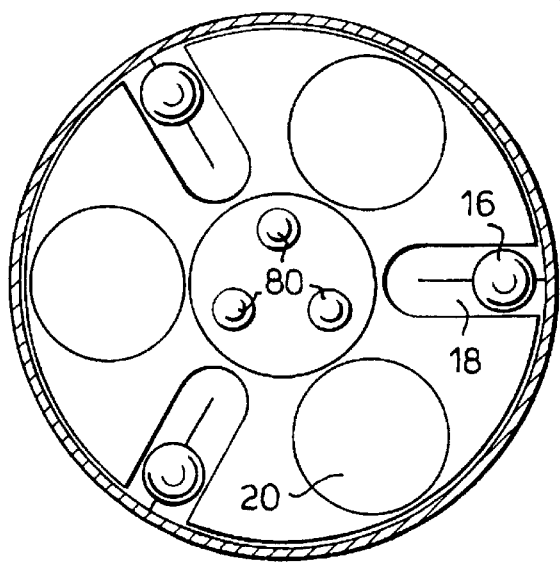
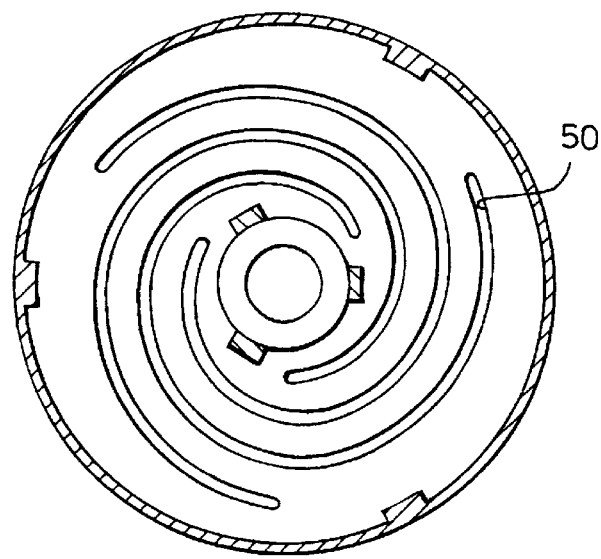

MEASURING PROBE WITH DIAPHRAGMS AND MODULES

The present invention relates to a measuring probe, also known as an analogue or proportional probe, and which may, for example, be used on a coordinate positioning machine, such as a coordinate measuring machine or machine tool, in order to measure the shape, form, or dimensions of an object.

A measuring probe typically includes a relatively fixed structure, which usually has the form of a housing, and a relatively movable structure the function of which is to retain a workpiece-contacting stylus, and is therefore frequently known as a stylus holder. The stylus holder is suspended within the housing by a mechanism which provides relative motion of one relative to the other. Relative displacement of the stylus holder and housing, (and therefore changes in relative displacement during relative motion) is detectable by one or more transducers, which are usually mounted to, or otherwise provided within the housing of the probe.

In use, the probe and a workpiece under inspection are mounted to relatively movable parts of the machine (the probe being mounted to the machine by the housing, thus enabling the stylus to move freely), and the machine is operated to bring the stylus into contact with a surface of the object in respect of which form, dimension, or contour information is required. Whilst the stylus is in contact with the surface, the transducer outputs from the probe are directly indicative of the relationship between the part of the machine upon which the probe is mounted and the surface under inspection. The position of a point upon the surface relative to a fixed reference point on the machine may thus be determined from signals indicative of the relative position of the two relatively movable parts of the machine, and the transducer outputs of the probe.

One known form of analogue probe is disclosed in European Patent No. 544854, and has a housing relative to which a stylus holder is suspended by a mechanism which includes a first flexible diaphragm connecting stylus holder to an intermediate member, which is then in turn connected to the housing via two further mutually parallel flexible diaphragms. A similar design of probe is disclosed in European Patent 426492. Both prior art configurations of probe provide releasable mounting of a stylus to the stylus holder by means of magnets and mutually engageable elements forming a repeatable kinematic location. This enables a user to alter the configuration of stylus in dependence upon a particular inspection task to be undertaken with the probe.

One aspect of the present invention provides a modular configuration of probe, in which the suspension mechanism connecting the stylus holder to the housing is provided within a suspension module that is releasably and repeatably connectable to a transducer module containing one or more sensors of the probe transducers. In accordance with this aspect of the present invention, one configuration of stylus may be exchanged for another by exchanging the suspension module. Also by arranging that the mutually engageable elements locating the suspension module on the transducer module are situated on the housing of the suspension module and transducer module respectively, rather than on the stylus holder as is the case in the prior art, the inertial mass carried by the suspension mechanism is reduced. In this way the sensitivity of the probe is increased.

Any suitable suspension mechanism may be provided within the suspension module, such as, for example, a series of parallel leaf springs, as disclosed in U.S. Pat. No. 4,084, 323, a series of linear bearings as disclosed in U.S. Pat. No. 5,088,208, an assembly of linkages, each of which is connected both to the stylus holder and the housing as shown in U.S. Pat. No. 4,523,383, or one or more flexible diaphragms, such as disclosed, for example in U.S. Pat. No. 5,345,689 or U.S. Pat. No. 4,158,919.

According to another independent aspect of the present invention a measuring probe comprises a housing having an axis, a stylus holder extending along the axis and to which a stylus is connectable, and a suspension system for the stylus holder, wherein the suspension system comprises at least a pair of substantially planar diaphragms connected between the stylus holder and the housing and lying in first and second parallel planes orthogonal to, and spaced apart along, the axis, both of said diaphragms allowing limited axial movement of the stylus holder, and at least one of the diaphragms being sufficiently flexible in its plane to allow limited transverse movement of the stylus holder in the plane of said at least one diaphragm.

In order to achieve the required flexibility of the, or each of said flexible diaphragms, one or more channels are provided through the respective diaphragms.

In one embodiment, the diaphragms are identical and the channels are of a substantially spiral configuration, each diaphragm having three such channels circumferentially offset by 120°. By virtue of such an arrangement, a relatively simple and friction free suspension mechanism is afforded together with a relatively compact construction.

With such a suspension mechanism, the stylus holder is displaced relative to the housing, upon the application of a force to the stylus, either linearly in the direction of the probe axis, or in a tilting manner, in planes substantially transverse to the probe axis. Detection of the linear axial displacement and the tilting displacement of the stylus holder will provide an indication of the position of the stylus sensing tip, for a given length of stylus. Because the suspension mechanism provides tilting action, different lengths of styli will produce, for a given linear deflection transverse to the axis at the stylus tip, a different degree of tilting of the stylus holder relative to the probe housing. Typically this is taken into account by calibration of the machine upon which the probe is to be used.

Alternatively the transducer system used may be configured to compensate for different lengths of stylus producing different tilting angles for a given displacement transverse to the axis at the stylus tip.

The transducer system used is preferably an optical system which includes a light source which emits a beam of light incident upon an optical feature mounted to the stylus holder, which light beam is then passed on to a photosensitive detector that generates an output in dependence upon the incident position of the light beam on its photosensitive surface.

The optical feature is preferably provided by a reflective or refractive element that interacts with an incident beam to reflect or refract the beam upon interaction with the feature by an angle determined by one or more optical parameters of the feature. Thus, by varying the optical parameters which determine the reflective or refractive interaction, different tilting angles of the stylus holder (corresponding to the different tilting produced by a given tip deflection for different stylus lengths) may result in the same incident position of the reflective or refracted beam on the sensitive detector, thereby generating a constant output for a constant tip deflection transverse to the axis which is independent of the stylus length.

In one embodiment, the optical feature is provided by a mirror whose curvature is dependent upon the stylus length:

longer stylus lengths having a greater curvature of the mirror in order to ensure that a smaller tilting displacement produces the same deflected angle by virtue of reflection of the incident light beam at the curved mirror.

In an alternative embodiment the optical feature is provided by a Fresnel lens, for example.

Embodiments of the invention will now be described, by way of example, and with reference to the accompanying drawings, in which:

FIG. 2 is a section on II—II in FIG. 1;

FIG. 3 is a section on III—III in FIG. 1;

FIG. 4 is a section on IV—IV in FIG. 1;

Figure 1:
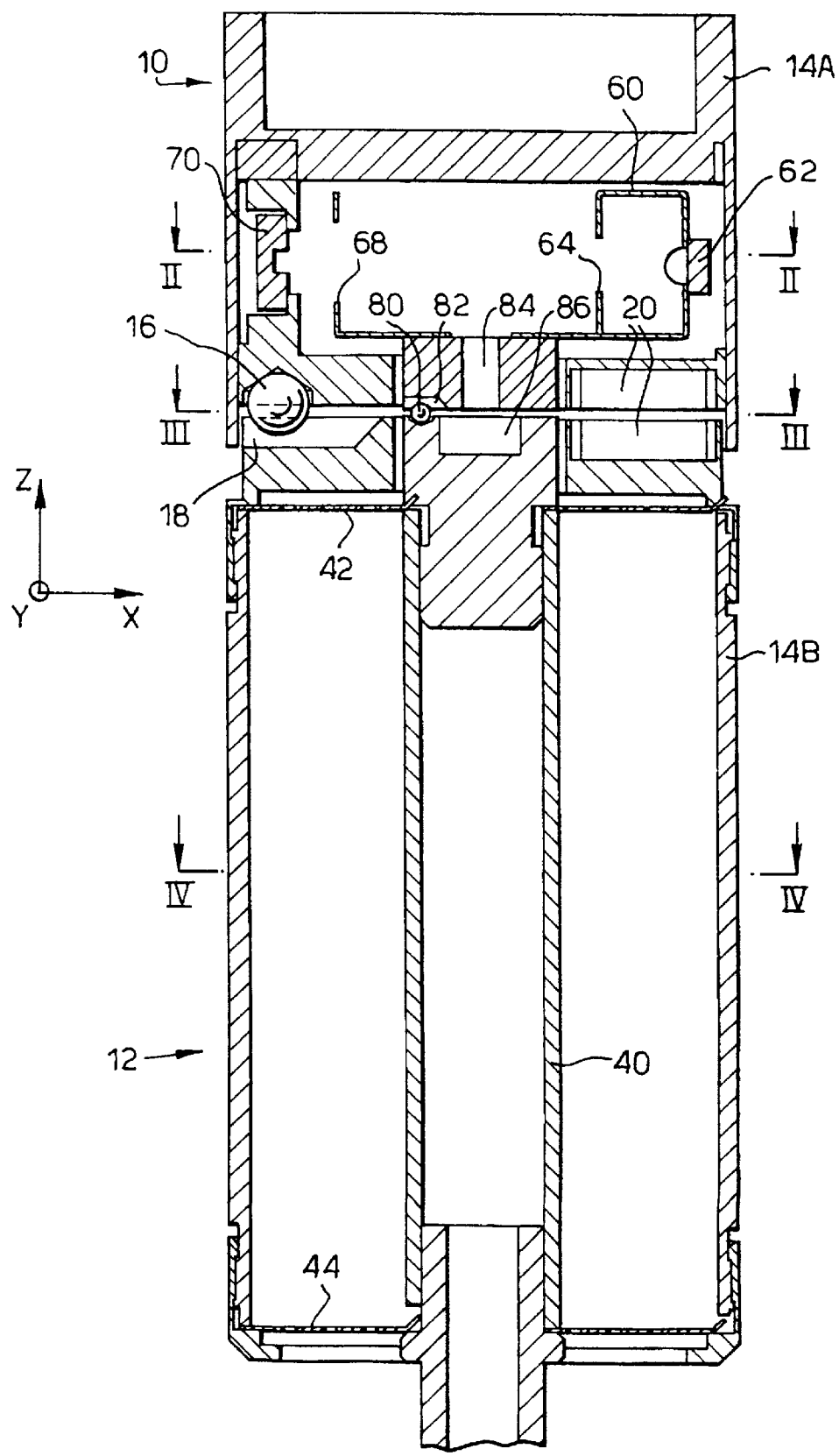
FIG. 1 is a section through a first embodiment of measuring probe according to the present invention.

Referring now to FIG. 1, a measuring probe includes a transducer module 10 upon which a suspension module 12 is releasably and repeatably mountable. The transducer and suspension modules 10,12 each have a relatively fixed structure provided by housings 14a and 14b respectively. Releasable mounting of the suspension module 12 upon the transducer module 10 takes place by virtue of mutually engageable location elements provided in the form of balls 16 on the transducer module housing 14a engageable within vee grooves 18 on the suspension module housing 14b, together with magnets 20 on the housings 14a and 14b which urge the location elements 16,18 into engagement. When the suspension module 12 is located upon the transducer module 10, the housings 14a and 14b effectively act as a single relatively fixed housing structure. The suspension module 12 carries an elongate and relatively rigid stylus holder 40, which is suspended relative to the housing 14b by a pair of axially spaced substantially planar diaphragms 42,44. Because the connections between the two modules are on the housing parts, the suspension module carries only the stylus holder and stylus. By this means the mass on the suspension system is reduced for increased sensitivity.

The stylus holder 40 is connected to the diaphragms substantially at their centre, and the housing 14b is connected to the diaphragms at their periphery. The pivoting motion of the stylus holder takes place about a point which, depending on the relative stiffnesses of the two diaphragms, may be positioned in the plane of either of the diaphragms, or at any axial position between the two. Referring now additionally to FIG. 4, each of the diaphragms 42,44 is cut through by three spiral channels 50, circumferentially offset at 120°. The channels have the effect of reducing the stiffness of the diaphragms 42,44 sufficiently to allow limited transverse movement of the stylus holder in their plane. It is thus possible for the stylus holder to pivot relative to the housing 14b about either the x or y axes, and also to translate relative to the housing 14b along the z axis.

The pivoting motion in this embodiment will take place about a point on the axis mid-way between the planes of the two diaphragms.

The use of the pair of transversely flexible diaphragms provides a simple inexpensive stylus mounting of high sensitivity. This type of mounting can be designed to have a low spring rate for low scanning forces.

In this embodiment in which both diaphragms are relatively flexible, it may be advantageous to add a third diaphragm, axially spaced mid-way between the two diaphragms 142, 144, and which is stiff in its own plane to prevent transverse movement of the stylus holder in this plane while allowing pivoting of the stylus holder about the centre of the diaphragm.

The advantages of the addition of the third diaphragm are that it adds to the structural stiffness of the spring combination and maintains a high natural frequency of vibration of the combination. By appropriate design of the third diaphragm the total spring rate can still be kept relatively low so as not to significantly increase the scanning forces.

In an alternative embodiment one of the diaphragms, preferably the lower diaphragm 44, is designed to be stiff in its plane, sufficiently to prevent any transverse movement of the stylus holder in that plane, and the other diaphragm 42, is designed to be flexible in its plane to allow limited transverse movement of the stylus holder in that plane. The result of this is that the stylus holder pivots about the centre of the diaphragm 44 when a transverse force is applied to the stylus tip in the x,y plane.

By appropriate selection of the axial separation of diaphragms 42, 44 in relation to their stiffness in the xy plane, it is also possible to configure the suspension module such that, for a given length of stylus connected to the stylus holder 40, substantially equal forces are required to deflect the stylus tip by the same amount in the xy plane and along the z axis.

Because of manufacturing tolerances it may be difficult to get the diaphragms exactly planar in their unstressed condition which can lead to them adopting a bi-stable rest position. To avoid this it may be desirable to ensure that the diaphragms are pre-stressed in their rest position.

Motion of the stylus holder 40 relative to the combined fixed structure provided by the housings 14a and 14b is detected by means of transducers within the transducer module 10. Several arrangements of transducers are possible.

Referring now additionally to FIG. 2, in one transducer arrangement, a shuttering member 60 is rigidly mounted to the stylus holder 40 in the sense that when the suspension module 12 is mounted to the transducer module 10, the shutter member 60 and the stylus holder 40 move in unison. The shutter member 60 has a substantially triangular configuration, and carries, at each of its vertices, a light source 62 (only one of which is shown in FIG. 2). Light from the source 62 passes through a cavity 64 provided in a screen 66, (the purpose of which is to prevent cross-talk between individual transducers), and then through a relatively narrow axially extending slit 68.

An image of the slit 68, which is formed by light passing therethrough, is incident upon a position sensitive photodetector 70, the output of which is dependent in magnitude upon the displacement in the y direction of the incident image of the slit 68. The magnitude of the output from the position sensitive detector 70 is thus indicative of the displacement in the y direction of the stylus holder 40. Two other transducers are provided, one of which has a further axially extending slit 72 to enable an indication of the displacement of the stylus holder in the x direction, and the other of which has a slit 74 which extends substantially in the xy plane in order to provide an indication of displacement of the stylus holder 40 in the axial or z direction.

The stylus holder 40 is disengageable from the shuttering member 60, in order to permit the exchange of modules.

Connection between the stylus holder 40 and the shuttering member is provided by three balls 80 on the stylus holder 40, each of which is engageable within a vee groove 82 provided at the base of the shuttering member. Magnets 84,86 urge the balls 80 into engagement within the vee grooves thereby to provide repeatable location of the shuttering member 60 upon the stylus holder 40 from one exchange of a given suspension module 12 to another. In a modification, the shuttering member 60 may be mounted rigidly to the stylus holder 40, such that a shuttering member is exchanged integrally with a suspension module. In this modification, the light sources for the transducers would be mounted upon the housing 14*a* of the transducer module, and the shuttering member 60 would thus serve only to provide the optical features (in the form of the slits) necessary for operation of the transducer in question.

Figure 5:
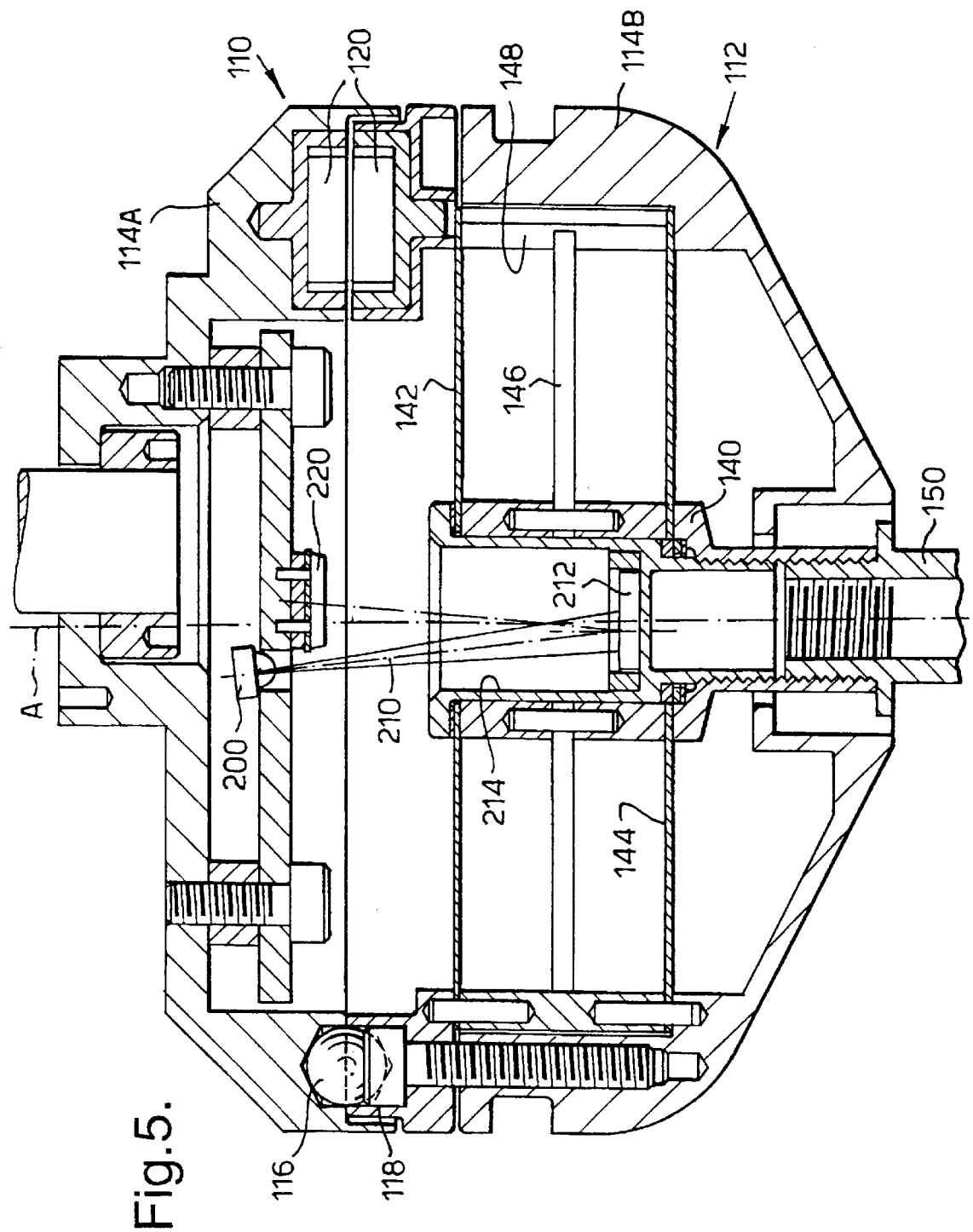
FIG. 5 is a section through a second embodiment of measuring probe according to the present invention.

A further embodiment of measuring probe is illustrated in FIG. 5, and includes a transducer module 110 upon which a suspension module 112 may be repeatably and releasably mounted by means of balls 116 on the transducer module housing 114*a*, urged into engagement with vee grooves 118 on the suspension module housing 114*b* by means of magnets 120.

A stylus holder 140 is suspended relative to the suspension module housing 114*b* by a pair of planar axially spaced diaphragms 142, 144 which have a configuration substantially as illustrated in FIG. 4 of the previous embodiment. The diaphragms are prevented from overstressing during connection of a stylus 150 to the stylus holder (which connection is typically made by screw-threaded engagement) by virtue of a pair of protective arms 146, which extend substantially radially with respect to the probe axis A, and are connected rigidly to the stylus holder 140. The distal ends of the arms 146 extend into slots 148 provided in the housing 114*b* of the suspension module with a small clearance. During normal operation of the probe the arms 146 do not come into contact with the sides of the slots 148, and suspension of the stylus holder 140 with respect to the housing 114*b* is undertaken exclusively by the diaphragms 142, 144. When a torque is applied to stylus holder 140 about the axis A, during screw-threaded connection of the stylus 150, the diaphragms 142, 144 initially undergo a small circumferential deflection with respect to the axis A, until the clearance between the distal ends of the arms 146 within the slots 148 is taken up, whereupon the torque applied to the stylus holder 140 is transmitted via the arms into the housing 114*b*. Thus the diaphragms 142, 144 are protected from undergoing damage due to excess torque.

Optical transducers are provided for detecting displacement of the stylus holder 140 relative to the fixed structure provided by the rigidly but releasably connected housings 114*a*, 114*b*. In this example two transducers are used and each transducer includes a laser diode light source 200 which projects a beam 210 upon an optical feature, such as a mirror or a Fresnel lens 212 which is situated within a cavity 214 at the top of the stylus holder 140. Light reflected off the optical feature 212 is incident upon a position sensitive detector 220, the output of which is indicative of the incident position of the reflected light, and therefore of the displacement of the stylus holder relative to the fixed structure of the probe.

Because, for different lengths of stylus 150, a given displacement of the tip of the stylus 150 in the xy plane will create a different angular displacement of the stylus holder 140 relative to the housing 114*a*, 114*b*, the output from the transducers 220 will differ, for a given displacement of the stylus tip in the xy plane depending upon the length of the stylus. In order to compensate for this, it is possible to provide an optical feature 212, such as an appropriately curved mirror, or a Fresnel lens having an appropriate refractive power, such that differing lengths of styli produce substantially the same output at the transducer 220 for the same displacement of the stylus tip in the xy plane.

In a modification to the illustrated embodiment of FIG. 5, the optical feature may be provided upon the upper surface of the stylus 150, which is configured to extend further into the housing 114*b*. A further independent aspect of the present invention thus provides an elongate stylus for a measuring probe having an optical feature suitable for use with a transducer, the feature being provided on the end of the stylus remote from the tip, and having one or more optical characteristics dependent upon the length of the stylus.

Figure 6:
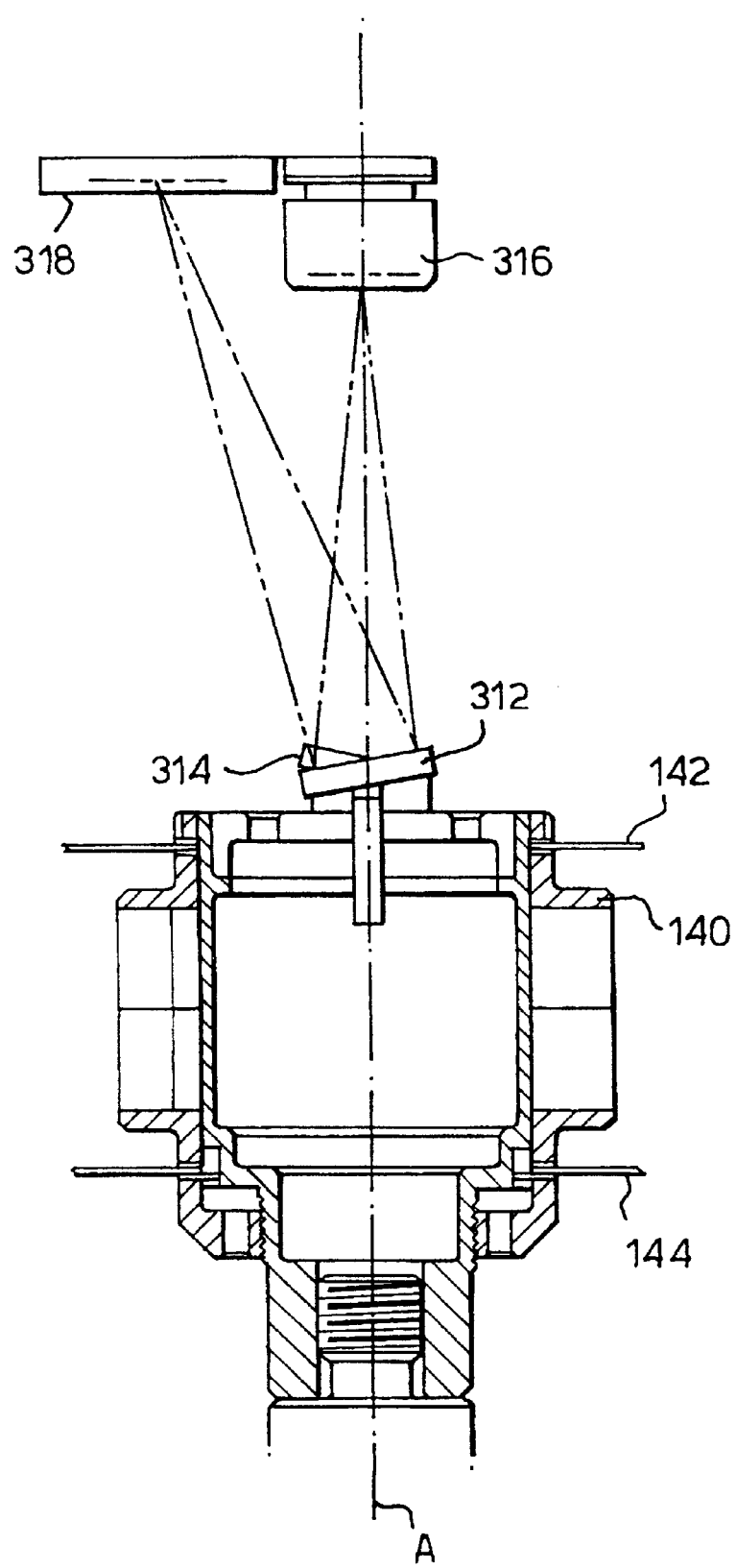
FIG. 6 is a part-section through another embodiment of the invention illustrating an alternative optical transducer.

A further embodiment of the invention will now be described with reference to FIG. 6 which illustrates part of a probe of similar construction to that shown in FIG. 5. Components which are identical to those of FIG. 5 are given the same reference numerals.

The stylus holder 140 is supported from the housing of the probe (not shown) by a pair of diaphragms 142, 144, both of which are of the type shown in FIG. 4.

The optical transducers in this embodiment consist of two side-by-side focusing mirrors 312, 314 tilted at opposite small angles to each other, and two side-by-side light sources 316 providing light beams aimed at the mirrors (only one of which is shown). Light reflected from the mirrors is directed onto side-by-side position sensitive detectors 318. Thus tilting of the stylus holder due to x or y deflections of the stylus tip will cause x or y movements of the focused spots on the detectors, and axial movements of the stylus will cause simultaneous x and/or y movements of the two focused spots on the detectors. Algorithms derived from calibration of the probe transducer system enable deflections of the stylus to be determined from the detector outputs.

Although the embodiments described refer to a pair of elastic devices in the form of diaphragms, clearly an equivalent effect can be achieved if either of the diaphragms were to be replaced by a different form of planar elastic device, for example, a substantially planar array of elastic elements of a different type such as coil springs. In such an embodiment there would be at least three springs in-such an array. Where three springs are used they would be spaced circumferentially at 120° intervals.

What is claimed is:

1. A measuring probe comprises a housing having an axis, a stylus holder extending along the axis and to which a stylus is connectable, and a suspension system for the stylus holder, wherein the suspension system comprises at least a pair of substantially planar elastic devices connected between the stylus holder and the housing and lying in first and second parallel planes orthogonal to, and spaced apart along the axis, both of said elastic devices allowing limited axial movement of the stylus holder, and at least one of said elastic devices being sufficiently flexible in its plane to allow limited transverse movement of the stylus holder in the plane of said at least one elastic device.

2. A measuring probe according to claim 1 wherein the elastic devices are diaphragms.

3. A measuring probe according to claim 2 wherein the probe has two diaphragms, a first one of which is sufficiently flexible in its plane to provide said transverse movement of the stylus holder, the second one of which is relatively stiff in its plane so as to prevent translation of the stylus holder in the plane of the second diaphragm.

4. A measuring probe according to claim 2 wherein the probe has two diaphragms, both of which are sufficiently flexible in their respective planes to allow limited transverse movements of the stylus holder in the planes of both diaphragms.

5. A measuring probe according to claim 2 wherein the flexibility of said at least one diaphragm is achieved by providing a plurality of channels through each respective diaphragm.

6. A measuring probe according to claim 5 wherein the channels are of substantially spiral configuration.

7. A measuring probe according to claim 1 wherein the stylus holder pivots about an axis orthogonal to the axis of the housing and passing through a point in a third plane lying between the planes of the elastic devices, and a third elastic device is connected between the stylus holder and the housing in the third plane.

8. A measuring probe according to claim 1 wherein the suspension system is housed in a suspension module, the probe further comprising a transducer module which contains transducers for measuring the deflection of the stylus holder, the suspension module and the transducer module both having mutually engageable location elements and releasable retention means whereby the suspension module is releasably and repeatably connectable to the transducer module.

9. A measuring probe according to claim 8 wherein the transducers in the transducer module are optical transducers.

10. A measuring probe according to claim 9 wherein the transducers each comprise a light source positioned close to the axis to direct a light beam onto an optical element movable with the stylus, and a position sensitive detector positioned to receive light returned from the optical element and derive a signal indicative of the stylus deflection.

11. A measuring probe according to claim 8 wherein the retention means comprise magnetic elements.

12. A measuring probe according to claim 3 wherein the flexibility of said at least one diaphragm is achieved by providing a plurality of channels through each respective diaphragm.

* * * * *